(12) United States Patent
Hagiwara et al.

(10) Patent No.: US 6,840,504 B2
(45) Date of Patent: Jan. 11, 2005

(54) HIGH-PRESSURE SWITCHING VALVE DEVICE

(75) Inventors: Shoichi Hagiwara, Obu (JP); Masaru Gamoh, Obu (JP); Nobutaka Teshima, Obu (JP); Kiyoshi Yoshizumi, Toyota (JP); Takeshi Yamamoto, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 105 days.

(21) Appl. No.: 10/109,728

(22) Filed: Apr. 1, 2002

(65) Prior Publication Data
US 2002/0139953 A1 Oct. 3, 2002

(30) Foreign Application Priority Data

Apr. 2, 2001 (JP) ........................................ 2001-103562

(51) Int. Cl.[7] .............................................. F16K 31/02
(52) U.S. Cl. .................. 251/332; 251/334; 251/129.15
(58) Field of Search ................................ 251/334, 332, 251/333, 318, 129.15

(56) References Cited

U.S. PATENT DOCUMENTS

| 2,678,187 | A | * | 5/1954 | Peters ........................ 251/332 |
| 2,953,165 | A | * | 9/1960 | Reynolds ..................... 251/332 |
| 2,959,392 | A | * | 11/1960 | Platen et al. ................. 251/332 |
| 4,008,876 | A | | 2/1977 | Bastle |
| 4,659,061 | A | * | 4/1987 | Scheffel ....................... 251/332 |
| 4,951,707 | A | * | 8/1990 | Johnson ....................... 251/332 |
| 5,067,521 | A | * | 11/1991 | Jenks et al. .................. 251/332 |
| 5,116,020 | A | * | 5/1992 | Peng et al. ................... 251/332 |
| 5,649,687 | A | | 7/1997 | Rosas et al. |
| 5,706,779 | A | | 1/1998 | Hewitt |
| 5,762,087 | A | | 6/1998 | Khadim |
| 5,803,056 | A | | 9/1998 | Cook et al. |
| 5,856,771 | A | | 1/1999 | Nippert |
| 5,937,896 | A | * | 8/1999 | Miyajima et al. ........... 251/333 |
| 6,148,841 | A | | 11/2000 | Davidson |

FOREIGN PATENT DOCUMENTS

| DE | 19908595 A1 | 8/2000 |
| JP | 8075029 | 3/1996 |
| JP | 11257523 | 9/1999 |

* cited by examiner

Primary Examiner—John Bastianelli
(74) Attorney, Agent, or Firm—Finnegan, Henderson, Farabow, Garrett & Dunner, LLP (57) ABSTRACT

A high-pressure switching valve device. A valve main body pressed to contact with an end face of a valve seat when the high-pressure switching valve device is closed, and a seal member pressed to contact with the end face of the valve seat when the high-pressure switching valve device is closed. When the high-pressure switching valve device is closed, the seal member is located on a high-pressure side and the valve main body is located on a low-pressure side.

6 Claims, 8 Drawing Sheets

HIGH-PRESSURE SWITCHING VALVE DEVICE

BACKGROUND OF THE INVENTION

1. Field of the Invention

The present invention relates to a high-pressure switching valve device for opening and closing a high-pressure fluid channel.

2. Description of the Related Art

Figure 7:
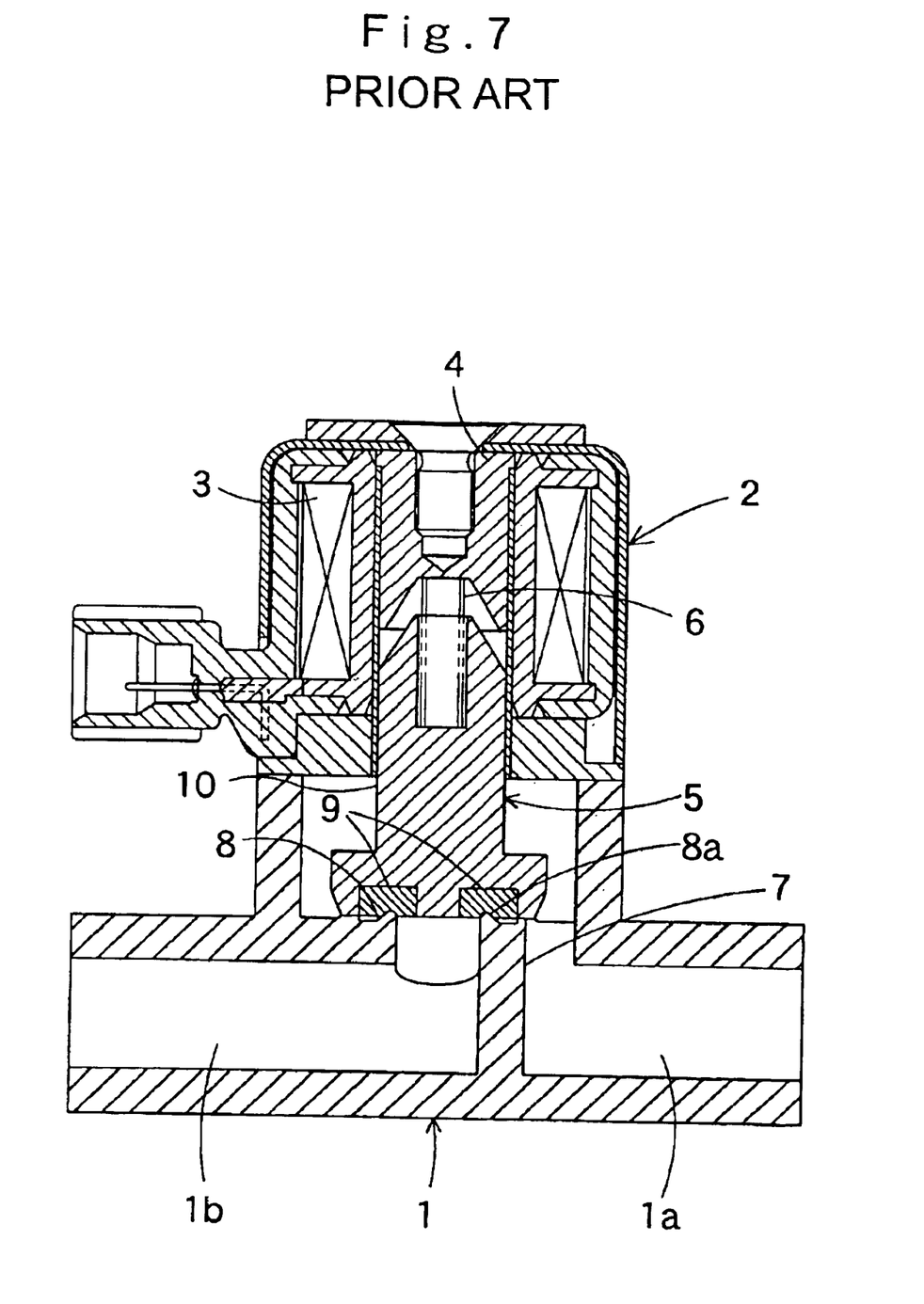
FIG. 7 is an overall block diagram of one example of a conventional high-pressure switching valve device.

FIG. 7 shows one example of a conventional high-pressure switching valve device.

In FIG. 7, reference symbol 1 denotes a high-pressure fluid channel, 1a denotes a high-pressure side of the high-pressure fluid channel 1, and 1b denotes a low-pressure side of the high-pressure fluid channel 1. The high-pressure fluid channel 1 is opened and closed by a high-pressure switching valve 2.

The high-pressure switching valve 2 consists of an electromagnetic solenoid valve. The electromagnetic solenoid valve 2 includes a coil 3, a fixed core 4 and the like on a fixed side and a plunger 5 on a movable side. A return spring 6 is provided between the fixed core 4 and the plunger 5. In the electromagnetic solenoid valve 2, if no current is applied to the coil 3, the plunger 5 is pressurized against the end face 8 of a valve seat 7 by the spring force of the return spring 6 to keep the high-pressure fluid channel 1 in a closed state. If a current is applied to the coil 3, a magnetic attraction force which attracts the plunger 5 toward the fixed core 4 is generated and this magnetic attraction force surpasses the spring force of the return spring 6, whereby the plunger 5 is separated from the valve seat end face 8 to open the high-pressure fluid channel 1.

Figure 8A:
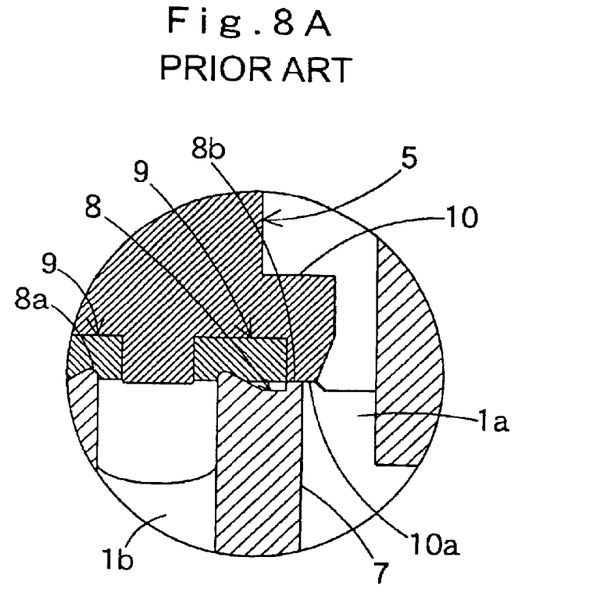
FIGS. 8A and 8B are an enlarged cross-sectional views of the important sections of the high-pressure switching valve device shown in FIG. 7 for explaining the operation of the device.
Figure 8B:
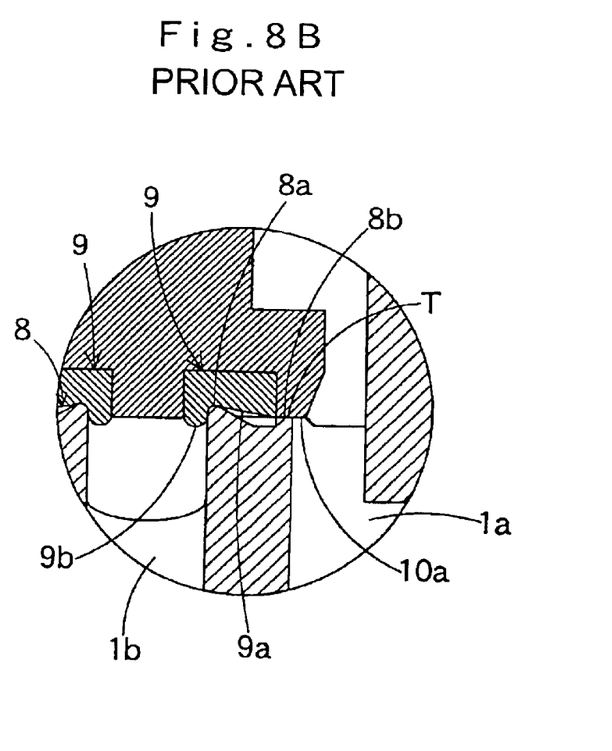

As shown in an enlarged view of FIG. 8, the annular valve seat end face 8 is formed so that an inner peripheral section 8a protrudes upward of FIG. 8. When the valve 2 is closed, a seal member 9 consisting of the elastic member of the plunger 5 is pressed to contact with this inner peripheral or protruding section 8a, thereby exhibiting a sealing action. In addition, when the valve 2 is closed, the outer peripheral section 8b of the valve seat end face 8 is abutted on the outer peripheral section 10a of the end face of a valve main body 10 consisting of the high strength member of the plunger 5.

SUMMARY OF THE INVENTION

According to the conventional high-pressure switching valve device stated above, if the pressure of the high-pressure side 1a of the high-pressure fluid channel 1 is relatively low, the seal member 9 is hardly deformed when the valve 2 is closed as shown in FIG. 8A and the life of the seal member 9 is, therefore, relatively long. However, if the pressure of the high-pressure side 1a of the high-pressure fluid channel 1 is relatively high, high pressure is applied to the end face outer peripheral section 9a of the seal member 9 through a contact section T between the end face outer peripheral section 10a of the valve main body 10 and the end face outer peripheral section 8b of the valve seat 7 to thereby expand and deform the inner peripheral section 9b of the seal member 9 which is located inward of the protruding section 8a of the valve seat end face 8 when the high-pressure switching valve device is closed as shown in FIG. 8B. If the deformation of the seal member 9 is repeated every time the high-pressure switching valve device is closed, the seal member 9 is damaged and the sealing property of the seal member 9 tends to be deteriorated.

Due to this, in the conventional high-pressure switching valve device, an allowable pressure limit is restricted according to the material strength of the seal member.

The present invention has been made to solve the disadvantage of the conventional high-pressure switching valve device as described above. It is an object of the present invention to provide a high-pressure switching valve device capable of greatly improving an allowable pressure limit by a simple structure without depending on the material strength of a seal member.

A high pressure switching valve device according to the present invention includes: a valve main body abutted on a valve seat when the high-pressure switching valve device is closed; and a seal member provided on an outer peripheral surface of the valve main body, and pressed to contact with an end face of the valve seat when the high-pressure switching valve device is closed, and is characterized in that the seal member is located on a high-pressure side and the valve main body is located on a low-pressure side.

The abutment of the valve main body on the valve seat is the abutment of the valve main body on the end face of the valve seat or the fitting and close contact of the valve main body into and with an inner peripheral surface of the valve seat.

The valve main body is constituted out of a high strength member, and the seal member is constituted out of an elastic member.

DESCRIPTION OF THE PREFERRED EMBODIMENTS

Figure 1:
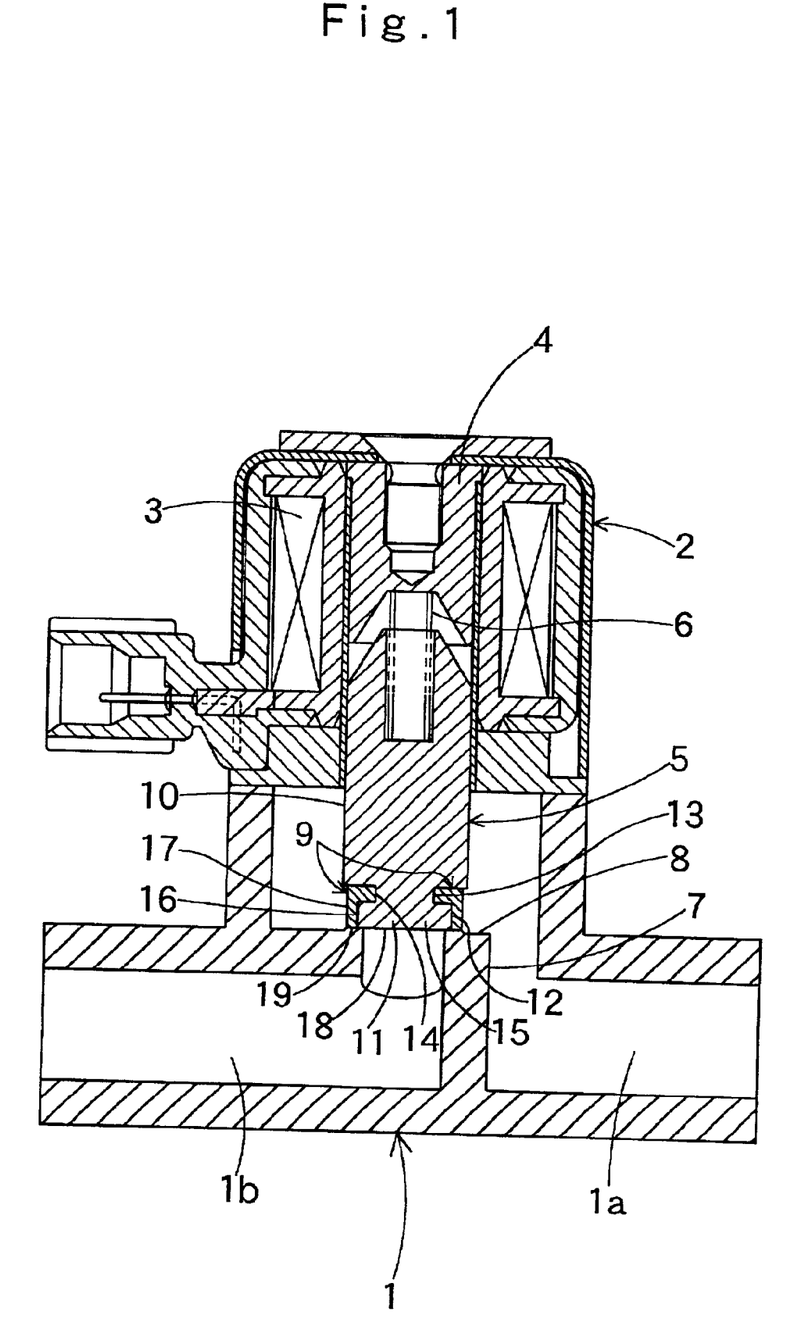
FIG. 1 is an overall block diagram of a high-pressure switching valve device according to the first embodiment of the present invention.
Figures 2A, 2B:
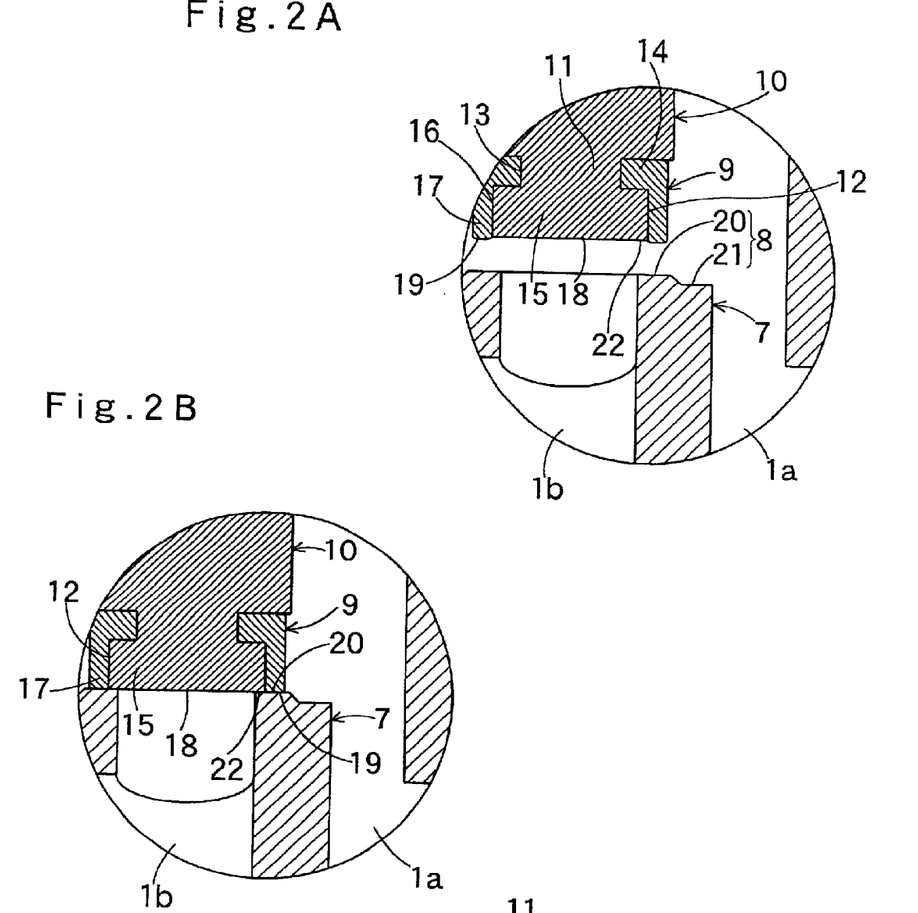
FIGS. 2A, 2B and 2C are an enlarged cross-sectional views of the important sections of the high-pressure switching valve device shown in FIG. 1 for explaining the operation of the device.
Figure 2C:
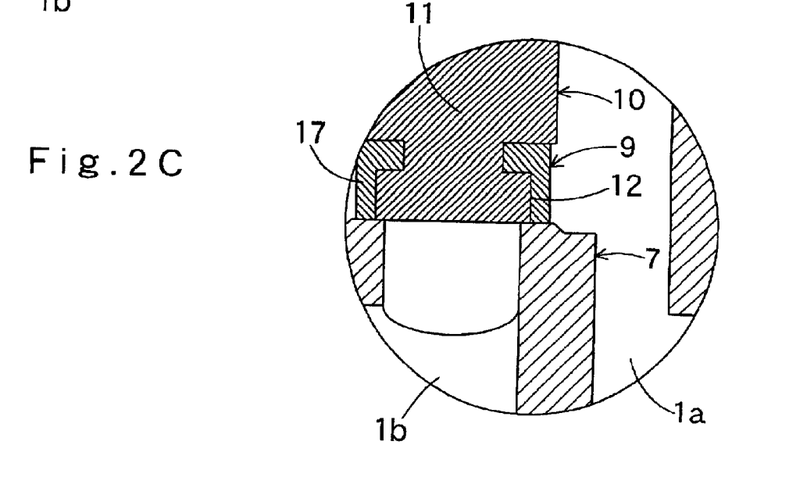

FIGS. 1, 2A, 2B and 2C show a high-pressure switching valve device according to the first embodiment of the present invention. FIG. 1 is an overall block diagram of the device and FIGS. 2A, 2B and 2C are enlarged cross-sectional views of the important sections of the valve device for explaining the operation thereof.

In FIG. 1, the high-pressure switching valve device includes a high-pressure fluid channel 1. The high-pressure fluid channel 1 consists of a high-pressure side 1a and a low-pressure side 1b and opened and closed by a high-pressure switching valve 2.

The high-pressure switching valve 2 consists of an electromagnetic solenoid valve. The electromagnetic solenoid valve 2 includes a coil 3, a fixed core 4 and the like on a fixed side and a plunger 5 on a movable side. A return spring 6 is provided between the fixed core 4 and the plunger 5. In the electromagnetic solenoid valve 2, if no current is applied to the coil 3, the plunger 5 is pressurized against the end face 8 of a valve seat 7 by the spring force of the return spring 6 to keep the high-pressure fluid channel 1 in a closed state. If a current is applied to the coil 3, a magnetic attraction force which attracts the plunger 5 toward the fixed core 4 is generated and this magnetic attraction force surpasses the spring force of the return spring 6, whereby the plunger 5 is separated from the valve seat end face 8 to open the high-pressure fluid channel 1 as shown in FIG. 2A.

The plunger 5 includes a valve main body 10 made of a high strength member. A groove 13 is formed on the outer peripheral surface 12 of the tip end section 11 of the valve main body 10. The inward flange section 14 of a seal member 9 made of an elastic member is fitted into this groove 13. In addition, a cylindrical section 17 which extends forward from the inward flange section 14 of the seal member 9 is provided on the outer peripheral surface 16 of a large diameter section 15 located forward of the groove 13 of the valve main body tip end section 11.

Macroscopically, the tip end surface 18 of the valve main body tip end section 11 and the tip end surface 19 of the seal member cylindrical section 17 are formed to be almost flush with each other. To be strict, as shown in FIG. 2A, the portion near the center of the cylindrical section tip end surface 19 is formed to protrude slightly forward.

As shown in enlarged views of FIGS. 2A, 2B and 2C, the annular valve seat end face 8 is constituted out of a flat surface having different levels which consists of an inward annular flat surface 20 and an outward annular flat surface 21. When the valve 2 is closed, the outer edge 22 of the tip end surface 18 of the valve main body tip end section 11 and the seal member tip end surface 19 are abutted on the inward annular flat surface 20. During this abutment, the slightly protruding tip end surface 19 of the seal member 9 is elastically deformed and plane-contacted with the inward annular flat surface 20.

FIG. 2B shows the cross-sectional shape of the seal member 9 when the high-pressure switching valve device is closed while the pressure of the high-pressure side 1a of the high-pressure fluid channel 1 is relatively low in the high-pressure switching valve device constituted as stated above. FIG. 2C shows the cross-sectional shape of the seal member 9 when the high-pressure switching valve device is closed while the pressure of the high-pressure side 1a of the high-pressure fluid channel 1 is relatively high.

As shown in FIGS. 2B and 2C, even if the pressure of the high-pressure side 1a of the high-pressure fluid channel 1 is relatively high, the cross-sectional shape of the seal member 9 is almost the same as that if the pressure of the high-pressure side 1a of the high-pressure fluid channel 1 is relatively low. The reason is as follows. When the pressure of the high-pressure side 1a is high, high pressure is applied to the cylindrical section 17 of the seal member 9. However, the outer peripheral surface 12 of the valve main body tip end section 11 entirely receives the high pressure.

According to the high-pressure switching valve device in the first embodiment, therefore, it is possible to prevent the partial expansion and deformation of the seal member unlike the conventional high-pressure switching valve device and to ensure the sealing property of the seal member for a long period of time. Thus, it is possible to greatly improve an allowable pressure limit without univocally depending on the material strength of the seal member.

Figure 3:
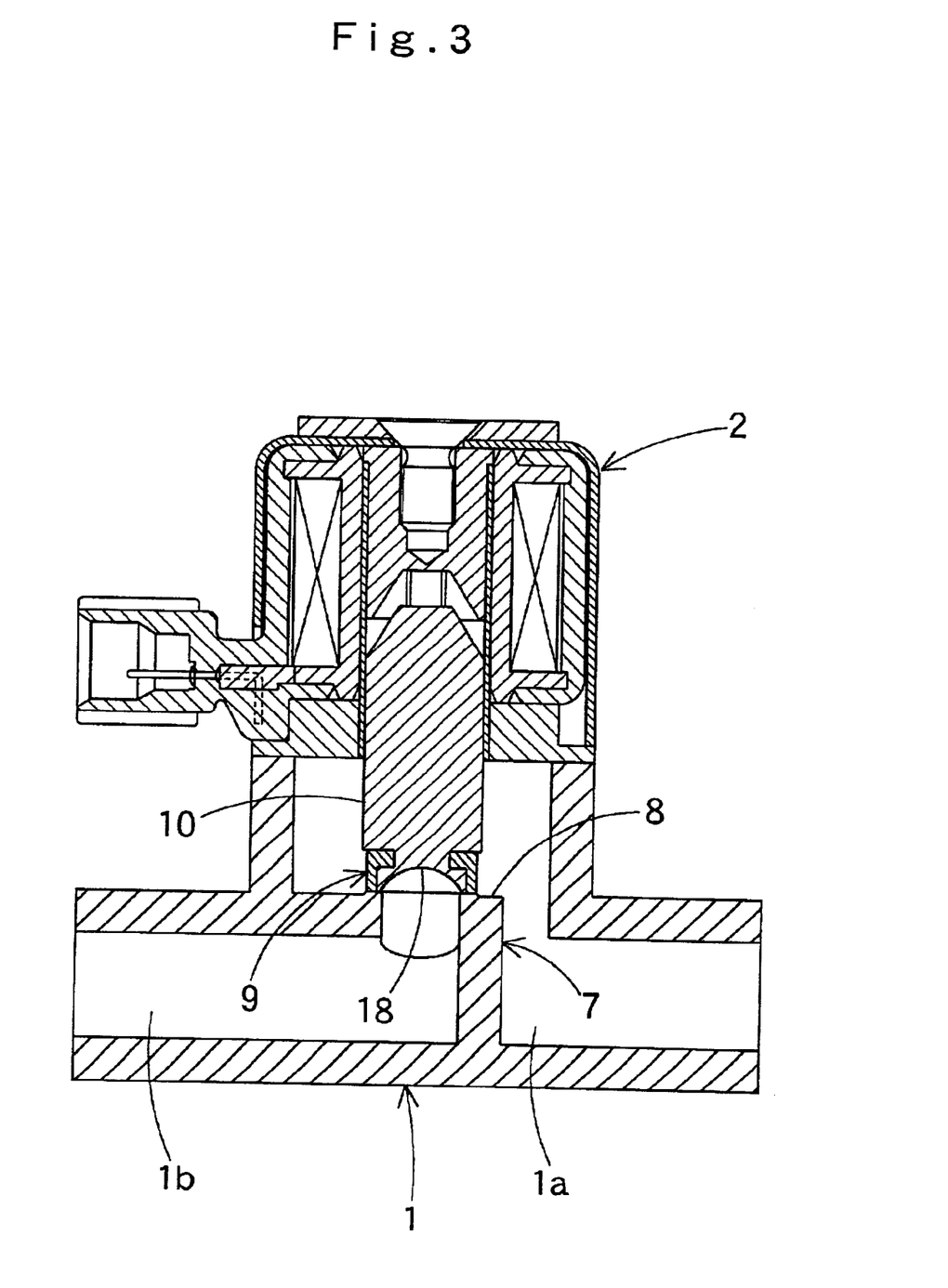
FIG. 3 is an overall block diagram of a high-pressure switching valve device according to the second embodiment of the present invention.
Figures 4A, 4B, 4C:
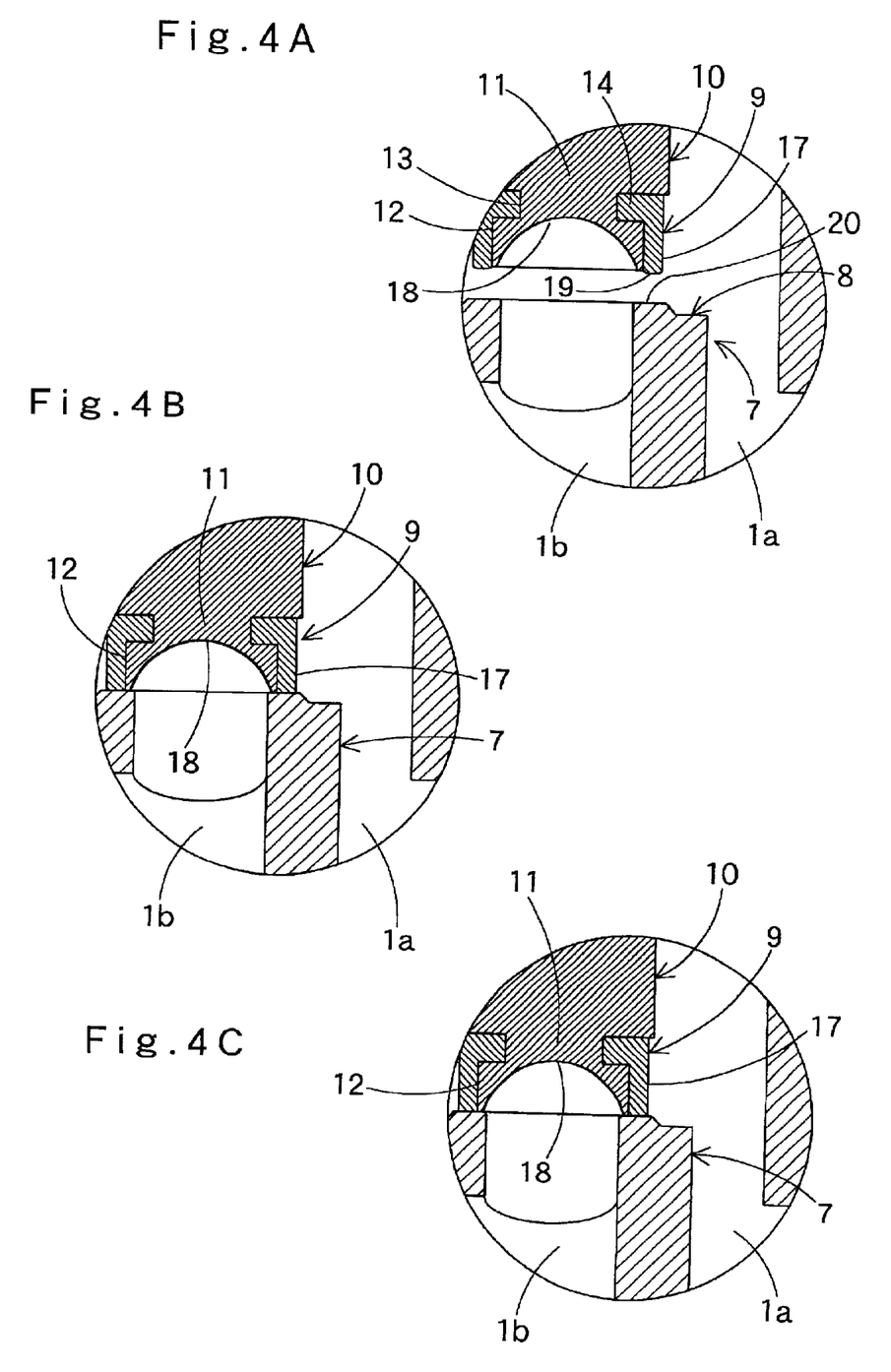
FIGS. 4A, 4B and 4C are an enlarged cross-sectional views of the important sections of the high-pressure switching valve device shown in FIG. 3 for explaining the operation of the device.

FIGS. 3, 4A, 4B and 4C show a high-pressure switching valve device according to the second embodiment of the present invention. FIG. 3 is an overall block diagram of the valve device and FIGS. 4A, 4B and 4C are enlarged cross-sectional views of the important sections of the valve device for explaining the operation of the valve device.

The high-pressure switching valve device in the second embodiment differs from that in the first embodiment as follows. In the first embodiment, the tip end surface 18 of the valve main body 10 is formed into a flat surface. In the second embodiment, the tip end surface 18 of the valve main body 18 is formed to be generally, entirely spherical. The remaining constitution is the same as that of the first embodiment.

FIG. 4A shows the cross-sectional shape of the seal member 9 when the high-pressure switching valve device in the second embodiment is opened. FIG. 4B shows the cross-sectional shape of the seal member 9 when the high-pressure switching valve device is closed while the pressure of the high-pressure side 1a of the high-pressure fluid channel 1 is relatively low. FIG. 4C shows the cross-sectional shape of the seal member 9 when the high-pressure switching valve device is closed while the pressure of the high-pressure side 1a of the high-pressure fluid channel 1 is relatively high.

As shown in FIGS. 4B and 4C, even if the pressure of the high-pressure side 1a of the high-pressure fluid channel 1 is relatively high, the cross-sectional shape of the seal member 9 is almost the same as that if the pressure of the high-pressure side 1a of the high-pressure fluid channel 1 is relatively low. The reason is the same as that described in the first embodiment. Namely, when the pressure of the high-pressure side 1a is high, high pressure is applied to the cylindrical section 17 of the seal member 9. However, the outer peripheral surface 12 of the valve main body tip end section 11 entirely receives the high pressure.

Therefore, according to the high-pressure switching valve device in the second embodiment as in the case of the first embodiment, it is possible to prevent the partial expansion and deformation of the seal member unlike the conventional high-pressure switching valve device and to ensure the sealing property of the seal member for a long period of time. Thus, it is possible to greatly improve an allowable pressure limit without univocally depending on the material strength of the seal member.

Figure 5:
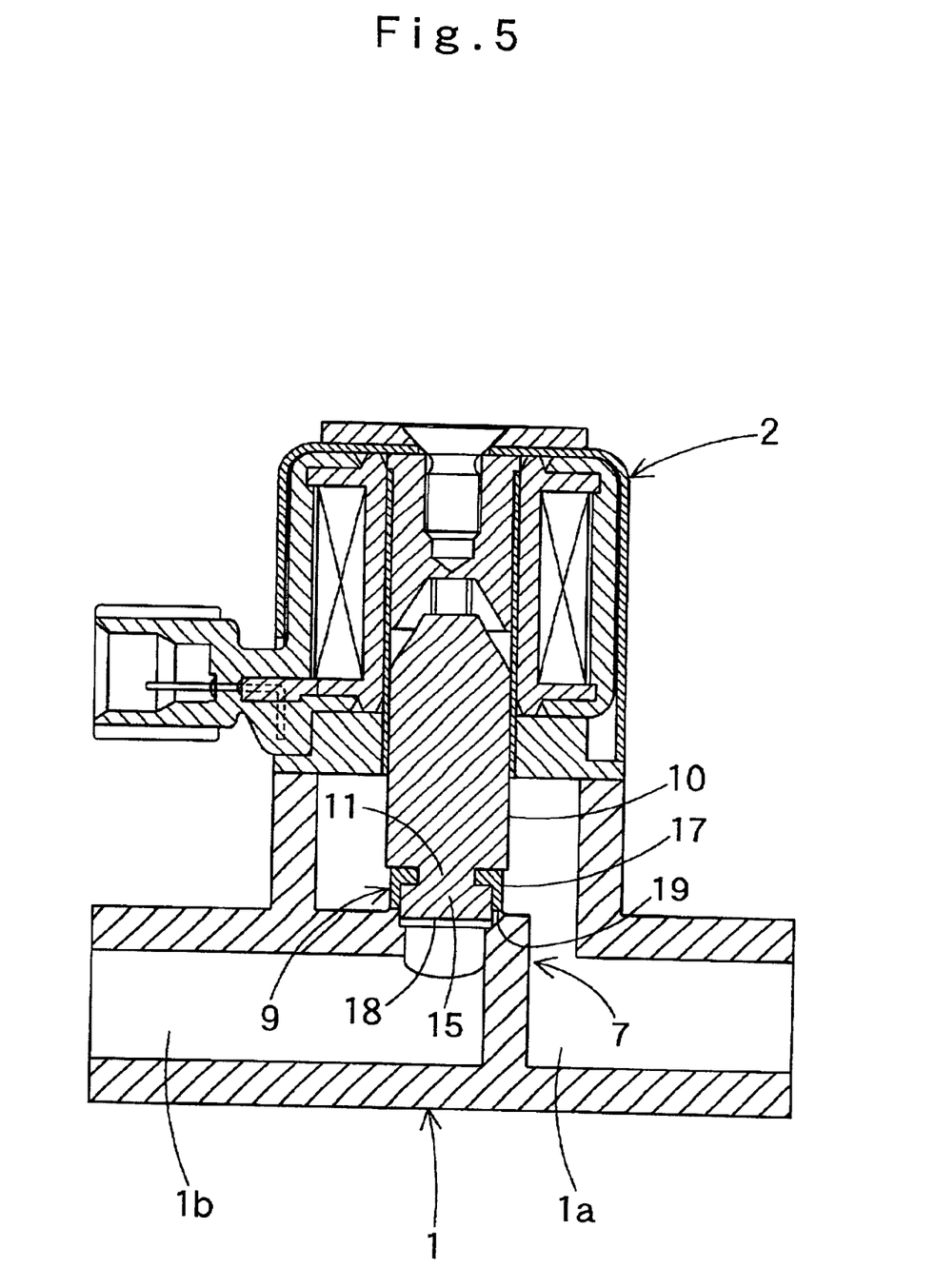
FIG. 5 is an overall block diagram of a high-pressure switching valve device according to the third embodiment of the present invention.
Figures 6A, 6B, 6C:
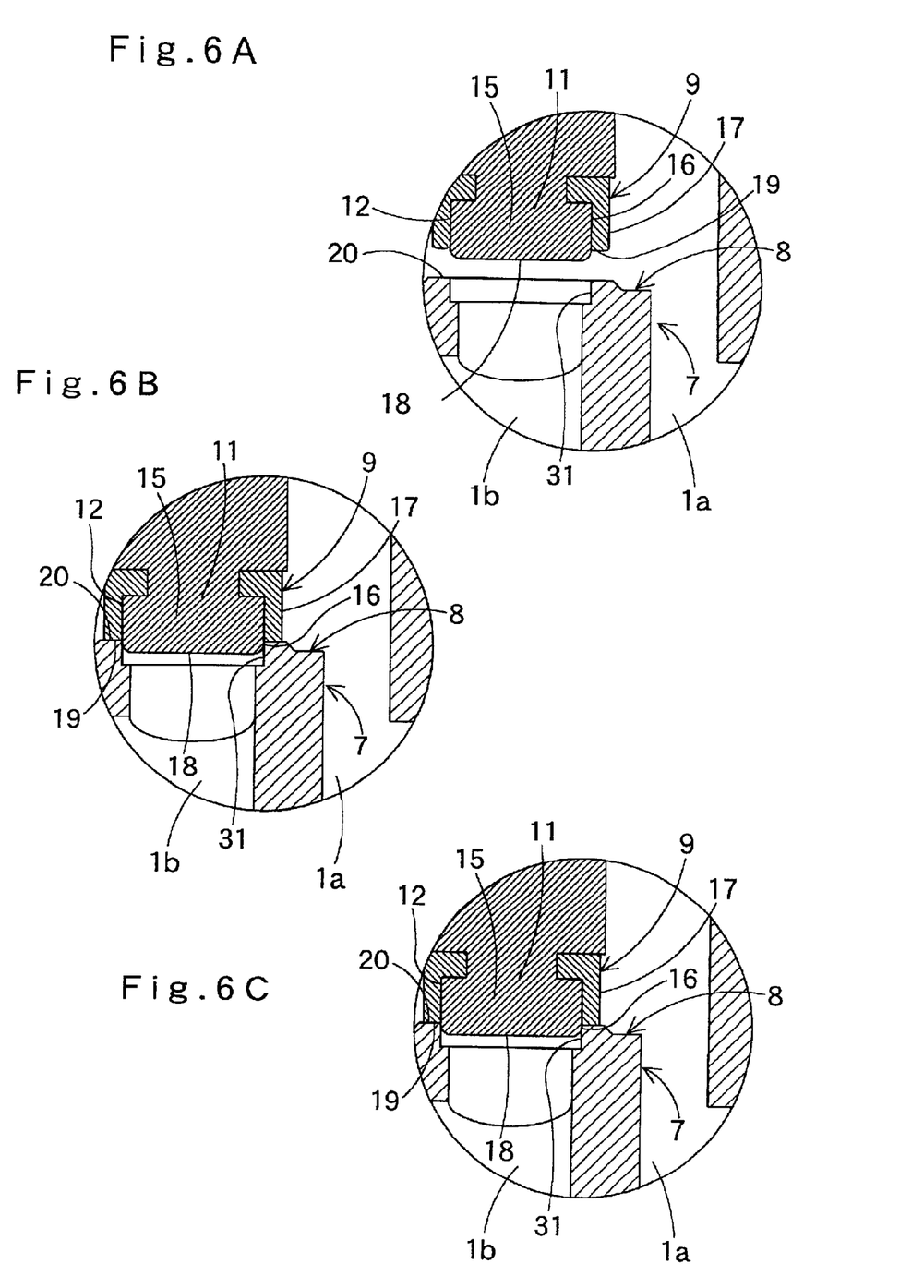
FIGS. 6A, 6B and 6C are an enlarged cross-sectional views of the important sections of the high-pressure switching valve device shown in FIG. 5 for explaining the operation of the device.

FIGS. 5, 6A, 6B and 6C show a high-pressure switching valve device according to the third embodiment of the present invention. FIG. 5 is an overall block diagram of the valve device and FIGS. 6A, 6B and 6C are enlarged cross-sectional views of the important sections of the valve device for explaining the operation thereof.

In the high-pressure switching valve device according to the third embodiment, the tip end surface 18 of the valve main body tip end section 11 protrudes largely than the tip end surface 19 of the seal member cylindrical section 17. When the valve device is closed, the large diameter section 15 of the valve main body tip end section 11 is partially fitted into the valve seat 7, the outer peripheral surface 16 of the large diameter section 15 closely contacts with the inner peripheral surface 31 of the valve seat 7 and the tip end surface 19 of the seal member 9 plane-contacts with the inward annular flat surface 20 of the valve seat end face 8.

FIG. 6A shows the cross-sectional shape of the seal member 9 when the high-pressure switching valve device in the second embodiment is opened. FIG. 6B shows the cross-sectional shape of the seal member 9 when the high-pressure switching valve device is closed while the pressure of the high-pressure side 1a of the high-pressure fluid channel 1 is relatively low. FIG. 6C shows the cross-sectional shape of the seal member 9 when the high-pressure switching valve device is closed while the pressure of the high-pressure side 1a of the high-pressure fluid channel 1 is relatively high.

As shown in FIGS. 6B and 6C, even if the pressure of the high-pressure side 1a of the high-pressure fluid channel 1 is relatively high, the cross-sectional shape of the seal member 9 is almost the same as that if the pressure of the high-pressure side 1a of the high-pressure fluid channel 1 is relatively low. The reason is the same as that described in the first embodiment. Namely, when the pressure of the high-pressure side 1a is high, high pressure is applied to the cylindrical section 17 of the seal member 9. However, the outer peripheral surface 12 of the valve main body tip end section 11 entirely receives the high pressure.

Therefore, according to the high-pressure switching valve device in the third embodiment as in the case of the first and second embodiments, it is possible to prevent the partial expansion and deformation of the seal member unlike the conventional high-pressure switching valve device and to ensure the sealing property of the seal member for a long period of time. Thus, it is possible to greatly improve an allowable pressure limit without univocally depending on the material strength of the seal member. Furthermore, according to the third embodiment, since the tip end surface 19 of the seal member cylindrical section 17 is located on the valve opening direction side relative to the tip end surface 19 of the valve main body tip end section 11, it is possible to protect the seal member 9.

According to the present invention, it is possible to greatly improve an allowable pressure limit with a simple structure and without depending on the material strength of the seal member.

What is claimed is:

1. A high-pressure switching valve device comprising:
   a coil generating a magnetic attraction force by an electric current;
   a fixed core in the center of said coil;
   a high-pressure switching valve having a plunger at the opposite position of said fixed core and having a return spring between said fixed core and said plunger; and
   a high-pressure fluid channel connecting a high pressure side channel and a low pressure side channel via a valve seat and opening and closing said valve seat by said high-pressure switching valve; wherein
   said switching valve device comprises a valve main body provided on said plunger abutted on said valve seat, and a seal member provided on an outer peripheral surface of said valve main body tip end portion, and pressed to contact with an end face of said valve seat; and
   said seal member and said valve main body are located on the high pressure side channel, with no portion of said seal member being located on the low pressure side channel when the switching valve is in a closed position.

2. A high-pressure switching valve device according to claim 1, wherein
   a tip end face of said valve main body tip end portion abuts on the end face of said valve seat.

3. A high-pressure switching valve device according to claim 1, wherein
   a tip end face of said valve main body tip end portion protrudes from the tip end face of the seal member cylindrical section, and is fitting and close contact of said valve main body into and with an inner peripheral surface of said valve seat.

4. A high-pressure switching valve device according to claim 1, 2, or 3, wherein
   said valve main body is constituted out of a high strength member, and said seal member is constituted out of an elastic member.

5. A high-pressure switching device according to claim 1, wherein an inward annular flat surface of said valve seat is generally planar, and the portion near the center of the seal member cylindrical section tip end surface is formed to protrude slightly forward.

6. A high-pressure switching device according to claim 1, wherein substantially all of said outer peripheral surface of said seal member receives the pressure on said high-pressure side channel.

* * * * *